(12) United States Patent
Wu et al.

(10) Patent No.: US 10,977,508 B2
(45) Date of Patent: Apr. 13, 2021

(54) LIVING BODY DETECTION METHOD, APPARATUS AND DEVICE

(71) Applicant: ADVANCED NEW TECHNOLOGIES CO., LTD., Grand Cayman (KY)

(72) Inventors: Peng Wu, Hangzhou (CN); Zhu Zhu, Hangzhou (CN); Hai Wang, Hangzhou (CN); Hongwei Zhao, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/888,584

(22) Filed: May 29, 2020

(65) Prior Publication Data

US 2021/0034896 A1 Feb. 4, 2021

Related U.S. Application Data

(63) Continuation of application No. PCT/CN2019/073576, filed on Jan. 29, 2019.

(30) Foreign Application Priority Data

Feb. 26, 2018 (CN) .......................... 201810159297.4

(51) Int. Cl.
*G06K 9/00* (2006.01)
(52) U.S. Cl.
CPC ....... *G06K 9/00906* (2013.01); *G06K 9/0061* (2013.01); *G06K 9/00248* (2013.01);
(Continued)

(58) Field of Classification Search
CPC ...... H04N 5/23293; H04N 1/62; H04N 1/628; H04N 5/23238; H04N 5/23296;
(Continued)

(56) References Cited

U.S. PATENT DOCUMENTS 6,711,293 B1 * 3/2004 Lowe ................... G06K 9/4671
382/219
7,050,622 B2 * 5/2006 Morishima ............ G02B 21/18
348/129
(Continued)

FOREIGN PATENT DOCUMENTS

CN 1426760 A 7/2003
CN 1842296 A 10/2006
(Continued)

OTHER PUBLICATIONS

Search Report dated Dec. 17, 2019, issued in related Taiwan Application No. 107145203 (1 page).
(Continued)

*Primary Examiner* — Negussie Worku

(57) ABSTRACT

Methods, systems, and apparatus, including computer programs encoded on computer storage media, for liveness detection are provided. One of methods includes: displaying an image to a user, and capturing a face image of the user while displaying the image to the user; determining an eye image of an eye of the user based on the face image; extracting a to-be-verified image from the eye image of the user, wherein the to-be-verified image is reflection of the displayed image in the eye of the user; comparing the displayed image with the to-be-verified image to determine whether the to-be-verified image matches the displayed image; and performing liveness detection on the user based on a result of comparison.

18 Claims, 3 Drawing Sheets

(52) U.S. Cl.
CPC ..... *G06K 9/00281* (2013.01); *G06K 9/00288* (2013.01); *G06K 9/00604* (2013.01); *G06K 9/00617* (2013.01); *G06K 2209/01* (2013.01)

(58) Field of Classification Search
CPC ............. H04N 13/366; G06K 9/00228; G06K 9/00261; G06K 9/6807; H04R 1/326; H04R 3/005; G06F 40/58; G06T 2207/30201; G06T 7/248; G10L 15/26
USPC .......................................................... 358/471
See application file for complete search history.

(56) References Cited

U.S. PATENT DOCUMENTS

| | | | |
|---|---|---|---|
| 7,218,776 B2* | 5/2007 | Sowinski | H04N 1/00132 358/302 |
| 8,411,909 B1 | 4/2013 | Zhao et al. | |
| 10,170,155 B2* | 1/2019 | Utsunomiya | G16H 20/30 |
| 10,459,965 B2* | 10/2019 | Zhao | G06F 3/04883 |
| 10,664,686 B2* | 5/2020 | Son | H04N 5/23296 |
| 2004/0133582 A1 | 7/2004 | Howard et al. | |
| 2005/0046730 A1* | 3/2005 | Li | H04N 5/23293 348/333.12 |
| 2005/0286099 A1* | 12/2005 | Kameyama | H04N 1/628 358/518 |
| 2008/0232693 A1* | 9/2008 | Guan | G06K 9/00228 382/190 |
| 2009/0237208 A1 | 9/2009 | Tsukahara et al. | |
| 2009/0285444 A1 | 11/2009 | Erol et al. | |
| 2010/0183199 A1 | 7/2010 | Smith et al. | |
| 2010/0299530 A1 | 11/2010 | Bell et al. | |
| 2010/0309303 A1 | 12/2010 | Sanchez-Ramos et al. | |
| 2011/0141114 A1* | 6/2011 | Chen | G09G 3/20 345/428 |
| 2012/0190505 A1* | 7/2012 | Shavit | G09B 19/0038 482/8 |
| 2012/0230555 A1 | 9/2012 | Miura et al. | |
| 2014/0009588 A1* | 1/2014 | Maruyama | G06T 7/248 348/51 |
| 2014/0037152 A1 | 2/2014 | Tan et al. | |
| 2014/0169642 A1* | 6/2014 | Law | G06K 9/00597 382/117 |
| 2015/0098630 A1 | 4/2015 | Pema et al. | |
| 2015/0160461 A1 | 6/2015 | Starner et al. | |
| 2015/0326570 A1 | 11/2015 | Publicover et al. | |
| 2016/0364609 A1 | 12/2016 | Ivanisov et al. | |
| 2016/0366317 A1 | 12/2016 | Ivanisov et al. | |
| 2017/0200197 A1 | 7/2017 | Brubaker | |
| 2017/0235482 A1 | 8/2017 | Ferren | |
| 2017/0286790 A1 | 10/2017 | Mapen et al. | |
| 2017/0372049 A1 | 12/2017 | Tieu | |
| 2019/0204604 A1* | 7/2019 | Wu | G06F 3/011 |
| 2020/0074173 A1 | 3/2020 | Trouboul et al. | |

FOREIGN PATENT DOCUMENTS

| | | |
|---|---|---|
| CN | 105389553 A | 3/2016 |
| CN | 106203372 A | 12/2016 |
| CN | 107077810 A | 8/2017 |
| CN | 107169429 A | 9/2017 |
| CN | 107527013 A | 12/2017 |
| CN | 108537111 A | 9/2018 |
| TW | 201041400 A | 11/2010 |
| WO | 2016/197389 A1 | 12/2016 |
| WO | 2017/025573 A1 | 2/2017 |

OTHER PUBLICATIONS

PCT International Search Report and the Written Opinion dated May 8, 2019, issued in related International Application No. PCT/CN2019/073576, with partial English translation (9 pages).
First Search dated Jan. 2, 2020, issued in related Chinese Application No. 201810159297.4 (2 pages).
First Office Action dated Jan. 10, 2020, issued in related Chinese Application No. 201810159297.4, with English machine translation (14 pages).
Second Office Action dated Feb. 21, 2020, issued in related Chinese Application No. 201810159297.4, with English machine translation (16 pages).
Saptarshi Chakraborty et al., "An Overview of Face Liveness Detection", International Journal of Information Theory (JIIT), vol. 3, No. 2, Apr. 2014, pp. 11-25.
Search Report for European Application No. 19 756 578.1 dated Jan. 29, 2021.

* cited by examiner

LIVING BODY DETECTION METHOD, APPARATUS AND DEVICE

CROSS REFERENCE TO RELATED APPLICATION

The present application is a continuation application of International Patent Application No. PCT/CN2019/073576, filed on Jan. 29, 2019, and entitled "LIVING BODY DETECTION METHOD, APPARATUS AND DEVICE," which claims priority to and is based on the Chinese Patent Application No. 201810159297.4, filed on Feb. 26, 2018. All of the above-referenced applications are incorporated herein by reference in their entirety.

TECHNICAL FIELD

The application relates to the field of computer technologies, and in particular, to a liveness detection method, apparatus, and device.

BACKGROUND

At present, biometric recognition manners such as facial recognition, voice recognition, and fingerprint recognition are gradually being applied to identity authentication in various scenarios. Compared with a traditional identity authentication manner such as password authentication, these authentication manners can authenticate and recognize a user with higher accuracy, thus further strengthening user information security.

Liveness detection is of particular importance during a facial recognition process. Detecting whether a face is a genuine face rather than a falsified face image such as a picture of a face is usually achieved by using a liveness detection technology, so as to effectively prevent people from using falsified faces to spoof facial recognition. However, the current liveness detection manners may bring discomfort to users during the facial recognition process.

Based on the current technologies, a more effective liveness detection manner is desirable.

SUMMARY

The application provides a liveness detection method, apparatus, and device for resolving the problem in the current technologies that the liveness detection brings discomfort to users.

The application provides a liveness detection method, comprising: displaying an image to a user, and capturing a face image of the user while displaying the image to the user; determining an eye image of an eye of the user based on the face image; extracting a to-be-verified image from the eye image of the user, wherein the to-be-verified image is reflection of the displayed image in the eye of the user; comparing the displayed image with the to-be-verified image to determine whether the to-be-verified image matches the displayed image; and performing liveness detection on the user based on a result of comparison.

In some embodiments, determining an eye image of the user based on the face image comprises: determining whether the face image contains the user's face or reaches a clarity; and in response to determining that the face image contains the user's face or reaches the clarity, extracting the eye image of the user from the face image.

In some embodiments, the displayed image comprises a first character, and the to-be-verified image comprises a second character; and comparing the displayed image with the to-be-verified image to determine whether the to-be-verified image matches the displayed image comprises: comparing characteristic information in the displayed image and characteristic information in the to-be-verified image to determine whether the characteristic information in the to-be-verified image matches the characteristic information in the displayed image, wherein the characteristic information in the displayed image comprises a size, a color, a location of the first character in the displayed image, or a combination thereof, and the characteristic information in the to-be-verified image comprises a size, a color, a location of the second character in the to-be-verified image, or a combination thereof.

In some embodiments, the displayed image comprises a first pattern, and the to-be-verified image comprises a second pattern; and comparing the displayed image with the to-be-verified image to determine whether the to-be-verified image matches the displayed image comprises: comparing characteristic information in the displayed image and characteristic information in the to-be-verified image to determine whether the characteristic information in the to-be-verified image matches the characteristic information in the displayed image, wherein the characteristic information in the displayed image comprises a shape, a size, a color, a location of the first pattern in the displayed image, or a combination thereof, and the characteristic information in the to-be-verified image comprises a shape, a size, a color, a location of the second pattern in the to-be-verified image, or a combination thereof.

In some embodiments, displaying an image to a user comprises: sequentially displaying a plurality of images in a specified order within a time.

In some embodiments, capturing a face image of the user while displaying the image to the user comprises: continuously capturing a plurality of face images of the user at least within the time. In some embodiments, determining an eye image of the user based on the face image comprises: for each of the plurality of continuously captured face images, determining an eye image of the user based on the respective face image.

In some embodiments, performing liveness detection on the user based on a result of comparison comprises: determining, from the plurality of displayed images, a quantity of matching images each matching a to-be-verified image included in at least one eye image of the user; and performing liveness detection based on the quantity of the matching images.

In some embodiments, performing liveness detection on the user based on a result of comparison comprises: determining, from the plurality of continuously captured face images, a quantity of matching face images for each of which a to-be-verified image included in the corresponding eye image of the user matches at least one displayed image; and performing liveness detection based on the quantity of the matching face images.

The application provides a liveness detection apparatus, comprising: one or more processors and one or more non-transitory computer-readable memories coupled to the one or more processors and configured with instructions executable by the one or more processors to cause the apparatus to perform operations comprising: displaying an image to a user, and capturing a face image of the user while displaying the image to the user; determining an eye image of an eye of the user based on the face image; extracting a to-be-verified image from the eye image of the user, wherein the to-be-verified image is reflection of the displayed image in the eye of the user; comparing the displayed image with the to-be-verified image to determine whether the to-be-verified image matches the displayed image; and performing liveness detection on the user based on a result of comparison.

The application provides a non-transitory computer-readable storage medium configured with instructions executable by one or more processors to cause the one or more processors to perform operations comprising: displaying an image to a user, and capturing a face image of the user while displaying the image to the user; determining an eye image of an eye of the user based on the face image; extracting a to-be-verified image from the eye image of the user, wherein the to-be-verified image is reflection of the displayed image in the eye of the user; comparing the displayed image with the to-be-verified image to determine whether the to-be-verified image matches the displayed image; and performing liveness detection on the user based on a result of comparison.

At least one of the above-described embodiments in the application can achieve the following beneficial effects: in one or more embodiments of the application, after a preset image is displayed to a user, a face image of the user may be captured, and a to-be-verified image included in an image of an eye of the user (also referred to as an eye image of the user) may be determined from the face image, so that liveness detection may be performed on the user based on the preset image and the to-be-verified image. In other words, the image reflected in the user's eyeball may be captured due to the high reflectivity feature of the eyeball; the captured reflection image is then matched with the displayed image, so as to perform liveness detection on the user. In this way, natural liveness detection may be performed on the user by using characteristics of a human body when the user looks at the preset image without feeling the detection, thereby bringing great convenience to the user.

BRIEF DESCRIPTION OF THE DRAWINGS

The accompanying drawings described herein are intended to facilitate further understanding of the application, and constitute a part of the application. The illustrative embodiments of the application and the descriptions thereof are used to explain the application, and are not intended to constitute an improper limitation on the application. In the accompanying drawings.

DETAILED DESCRIPTION

To ensure information security of a user, a terminal device may perform identity authentication on the user when the user makes a transaction. If the terminal device performs identity authentication on the user by using facial recognition, liveness detection is to be performed on an captured face image when facial recognition is being performed on the user.

In the current technologies, the terminal device may shine light of different colors and intensities on the user's face by virtue of a screen, so as to perform liveness detection by capturing light reflected by the face. Although such a manner may detect to some extent whether a current face image is a face image of a living body, the terminal device is required to shine relatively strong light onto the user's face so that the light reflected by the face may be captured. The relatively strong light used in this method brings discomfort to the user. Additionally, such a manner relies heavily on the surrounding environment in that if relatively strong ambient light is present in the user's environment, the terminal device will not be able to effectively capture the light reflected by the face, and thus cannot perform liveness detection on the user.

To resolve the above-described problem, in the application, the terminal device may display a preset image and capture a face image of the user looking at the preset image. The terminal device may determine, from the face image, a to-be-verified image included in an eye image of the user, so that liveness detection may be performed on the user based on the preset image and the to-be-verified image.

Since human eyes can reflect light very easily, the terminal device is not required to display, by means of a screen, to the user an image with relatively strong light. Instead, the terminal device may capture the to-be-verified image formed by reflection in the user's eyeball. By matching the to-be-verified image with the displayed preset image, the terminal device may perform natural liveness detection on the user while the user is not feeling the detection, which brings great convenience to the user.

To enable those skilled in the art to better understand the one or more embodiments of the application, the one or more embodiments of the application will be clearly described below in combination with the accompanying drawings of the one or more embodiments of the application. The embodiments described below are merely a part, but not all, of the embodiments of the application. All of other embodiments, obtained by those of ordinary skill in the art based on the embodiments of the application without any creative efforts, fall into the protection scope of the application.

Figure 1:
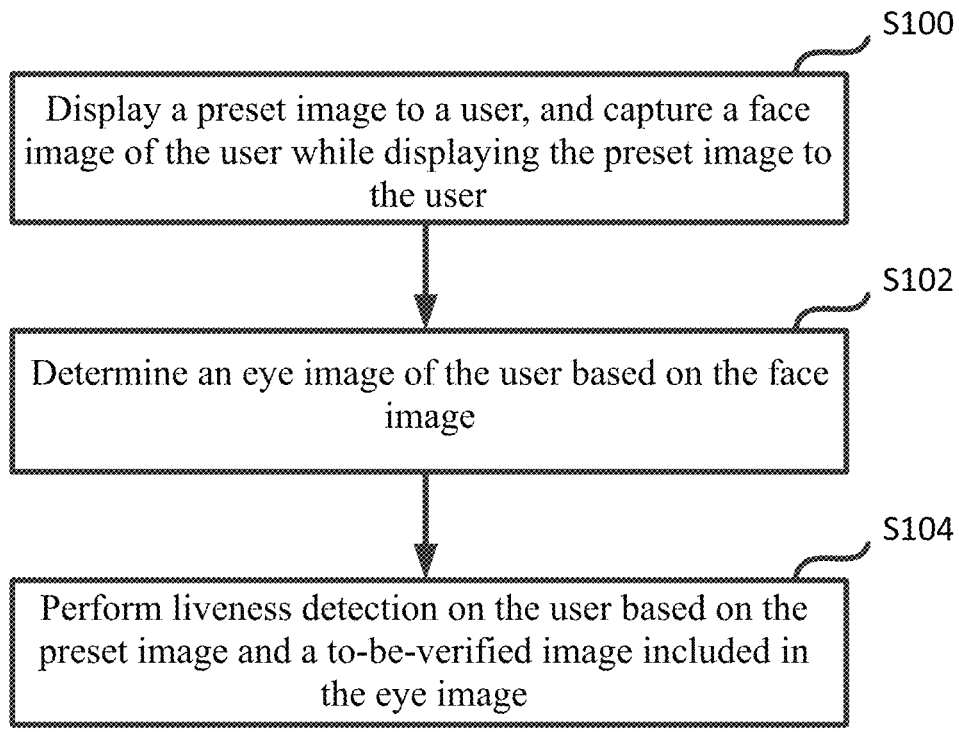
FIG. 1 is a schematic diagram of a liveness detection process according to some embodiments of the application.

FIG. 1 is a schematic diagram of a liveness detection process according to some embodiments of the application. The process comprises the following steps:

S100: displaying a preset image to a user, and capturing a face image of the user while displaying the preset image to the user.

When performing liveness detection on a user, a terminal device may display a preset image to the user. The preset image may be a default fixed image, or may be an image different from those used for previous liveness detection. In other words, during each liveness detection, the terminal device may display to the user the same preset image or a different preset image.

In some embodiments, the preset image may include information in a character form, such as a number or a word, or may include information in a pattern form. A size, shape, color, location, and the like of such information in the preset image may constitute characteristic information of the preset image. Since different preset images comprise different characters and patterns, and the characters and patterns in the preset images have different sizes, shapes, colors and the like, different characteristic information may be used to effectively identify different preset images. As a result, the terminal device may subsequently perform liveness detection on the user based on the characteristic information of the preset image. The terminal device described herein may be a device such as a smart phone, a tablet computer, or a notebook computer capable of performing liveness detection on the user.

After displaying the preset image to the user, the terminal device may capture, by using a preset image acquisition apparatus (such as a camera), a face image of the user looking at the preset image.

S102: determining an eye image of the user based on the face image.

In some embodiments, after capturing the face image of the user looking at the preset image, the terminal device may recognize, from the face image, a to-be-verified image formed by reflection in the user's eyeball, and then perform liveness detection on the user based on the to-be-verified image and the preset image in a subsequent process.

In some embodiments, after capturing the face image of the user, the terminal device may first determine whether the captured face image meets a preset condition by using a preset recognition manner; and after determining that the face image meets the preset condition, the terminal device may further determine, from the face image, an eye image of the user's eye in the face image as an eye image corresponding to the face image; and then the terminal device may extract the to-be-verified image from the eye image.

The preset condition described herein may be in different forms. For example, when it is determined that the image captured when the user looks at the preset image contains the user's face, it is determined that the face image meets the preset condition. In another example, when it is determined that the captured face image has a sharpness or clarity that reaches a set sharpness or clarity, it is determined that the face image meets the preset condition.

S104: performing liveness detection on the user based on the preset image and the to-be-verified image included in the eye image.

After determining the to-be-verified image from the captured face image, the terminal device may compare the captured to-be-verified image with the preset image that the terminal device has displayed to the user, and perform liveness detection on the user based on an obtained comparison result. For example, if the to-be-verified image is an image reflected in the user's eyeball when the user looks at the preset image, the content included in the two images should be the same. Based on this, the terminal device may compare characters and/or patterns comprised in the two images, or compare characteristic information including the shapes, sizes, colors, locations, and the like of the characters and/or patterns in the two images, or a combination thereof, so as to determine whether the two images are the same. For example, if the characteristic information of the characters in the two images are matched (e.g., the same or similar to some extent), then the two images are determined to be the same. In another example, if the characteristic information of the characters in the two images are matched (e.g., the same or similar to some extent), then the two images are determined to be the same. In still another example, if the characteristic information of the characters and the patterns are determined to be matched (e.g., the same or similar to some extent), then the two images are determined to be the same. If the two images are the same, it is determined that the currently captured face image is a face image of a living body; if the two images are different, it is determined that the face image is a face image of a non-living body. These may be shown in FIG. 2.

Figure 2:
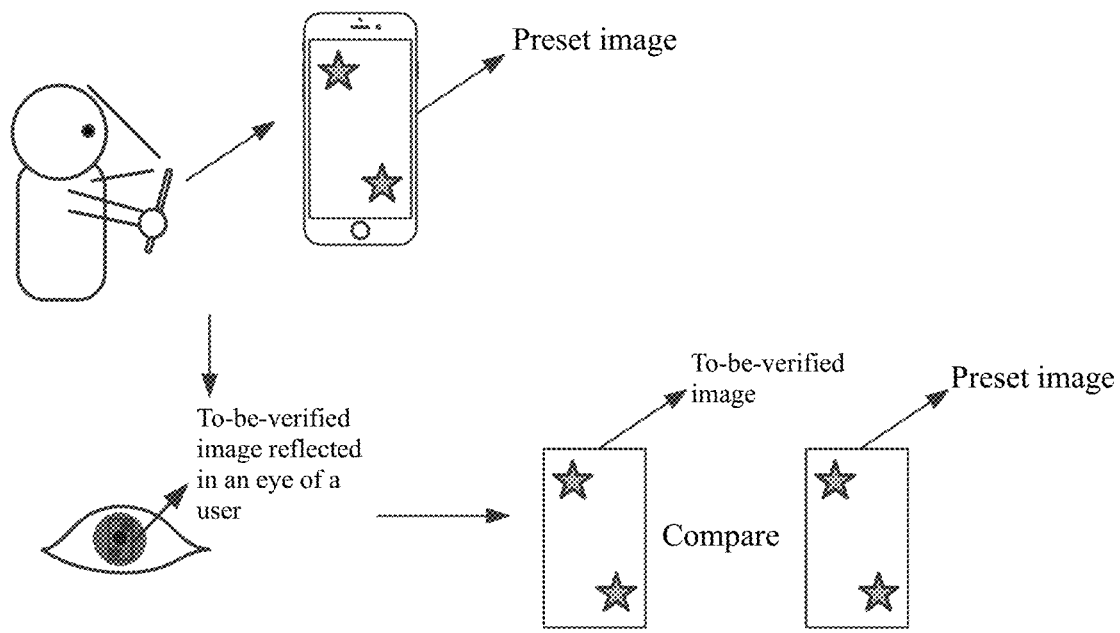
FIG. 2 is a schematic diagram of a terminal device performing liveness detection on a user by comparing a to-be-verified image with a preset image according to some embodiments of the application.

FIG. 2 is a schematic diagram of a terminal device performing liveness detection on a user by comparing a to-be-verified image with a preset image according to some embodiments of the application.

The terminal device may display to the user the preset image as shown in FIG. 2, and capture a face image of the user looking at the preset image. Then the terminal device may determine an eye image of the user's eye from the face image, so as to extract, from the eye image, a to-be-verified image reflected in the eyeball.

The to-be-verified image captured by the terminal device is a mirror image of the preset image. Therefore, the terminal device may horizontally flip the to-be-verified image, and then compare the flipped to-be-verified image with the preset image, so as to perform liveness detection on the user.

As shown in FIG. 2, the preset image contains two five-pointes stars. The sizes and locations of the two five-pointed stars in the preset image are the same as those of the two five-pointed stars included in the flipped to-be-verified image. Therefore, it may be determined that the to-be-verified image matches the preset image, and it may be further determined that the face image currently captured by the terminal device is a face image of a living body.

During liveness detection, the terminal device may display a static preset image to the user, or may display dynamically changing preset images to the user, i.e., display a plurality of preset images. Therefore, in the some embodiments, the terminal device may sequentially display a plurality of preset images in a specified order within a preset time, and may continuously capture face images of the user looking at the plurality of displayed preset images at least within the preset time.

For example, the terminal device may periodically display the preset images that change in a specified order in every three seconds. Then the terminal device may continuously capture a plurality of face images of the user looking at the continuously changed preset images, extract a plurality of to-be-verified images from the face images, and then compare the plurality of to-be-verified images with the plurality of preset images displayed by the terminal device, so as to perform liveness detection on the user, which is shown in FIG. 3.

Figure 3:
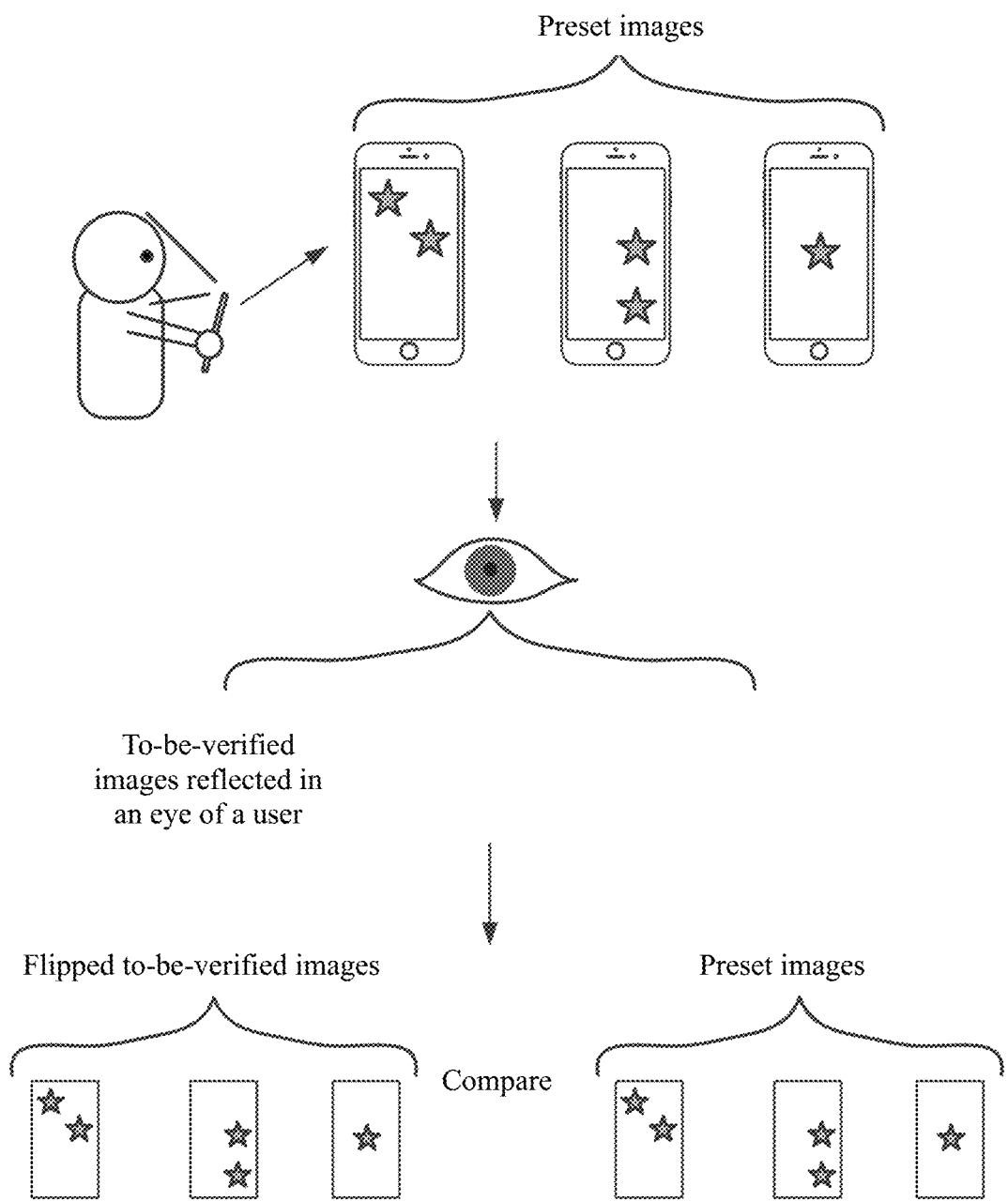
FIG. 3 is a schematic diagram of a terminal device performing liveness detection on a user by using a plurality of displayed preset images and a plurality of captured face images according to some embodiments of the application.

FIG. 3 is a schematic diagram of a terminal device performing liveness detection on a user by using a plurality of displayed preset images and a plurality of captured face images according to some embodiments of the application.

During liveness detection, the terminal device may, for example within three seconds, display three preset images to the user in a specified order, and capture face images of the user looking at the three preset images within the three seconds. Then the terminal device may extract, from the captured face images, to-be-verified images reflected in the user's eyeball. Since the to-be-verified images captured by the terminal device are mirror images of the preset images respectively, the terminal device may horizontally flip the determined to-be-verified images to obtain all flipped to-be-verified images; and then each of the flipped to-be-verified images is compared with the respective preset image displayed by the terminal device.

When it is determined that each of the flipped to-be-verified images matches the respective preset images displayed by the terminal device, it may be determined that the face images currently captured by the terminal device are face images of a living body.

In some embodiments, the terminal device may compare a plurality of captured face images with a plurality of displayed preset images, determine matching preset images from the plurality of preset images, and then perform liveness detection on the user based on the quantity of the preset images. The matching preset image described herein may be a preset image matching at least one to-be-verified image.

For example, assuming that the terminal device determines a plurality of to-be-verified images from a plurality of captured face images, and compares the plurality of to-be-verified images with a quantity of (e.g., represented by letter S) displayed preset images. It is found through comparison that the quantity of the matching preset images, among the plurality of preset images, that match the to-be-verified images is represented by letter A. Therefore, a ratio of the quantity A of the matching preset images to the total quantity S of displayed preset images may be determined. The terminal device may further determine whether the ratio reaches a set ratio; and if it is determined that the ratio reaches the set ratio, the terminal device may determine that the captured face image is a face image of a living body; if it is determined that the ratio does not reach the set ratio, the terminal device may determine that the captured face image is a face image of a non-living body.

The terminal device may further compare a plurality of captured face images with a plurality of displayed preset images, determine matching face images from the plurality of captured preset images, and then perform liveness detection on the user based on the quantity of the matching face images. The matching face image described herein is a face image matching at least one preset image displayed by the terminal device. For details, reference may be made to the above-described examples, which are not repeated herein.

In some embodiments, there may be many other manners in which the terminal device performs liveness detection on the user based on the determined to-be-verified images and the displayed preset images, which will not be illustrated herein one by one.

In the above-described embodiments, since human eyes can reflect light very easily, the terminal device is not required to display, by means of a screen, to the user an image with relatively strong light. Instead, the terminal device may capture the to-be-verified image reflected in the user's eyeball. By matching the to-be-verified image with the displayed preset image, the terminal device may perform natural liveness detection on the user while the user is not feeling the detection, which brings great convenience to the user.

In the application, after capturing the face image, the terminal device may first determine whether the captured image of the user is an image of a genuine face by using a preset recognition manner. After determining that the captured image is an image of a genuine face, the terminal device may further capture a current eye image of the user by using an image acquisition apparatus, and then extract, from the captured eye image, a to-be-verified image reflected in the user's eyeball.

The liveness detection method according to the one or more embodiments of the application is described above. Based on the same concept, the application further provides a liveness detection apparatus, as shown in FIG. 4.

Figure 4:
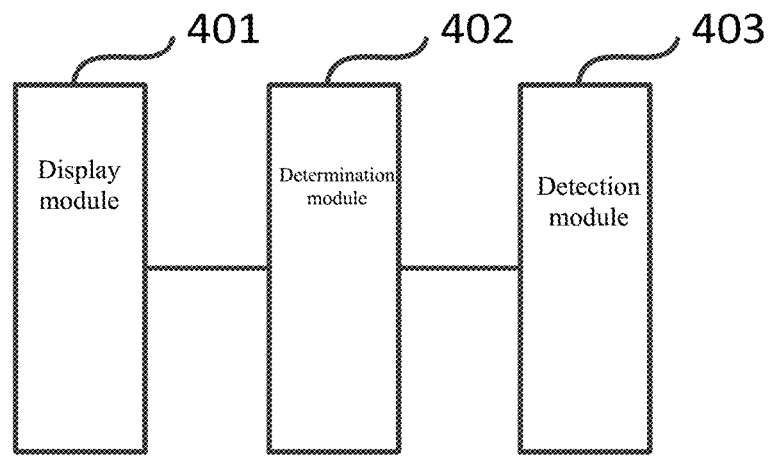
FIG. 4 is a schematic diagram of a liveness detection apparatus according to some embodiments of the application.

FIG. 4 is a schematic diagram of a liveness detection apparatus according to some embodiments of the application. The apparatus comprises: a display module 401, configured to display a preset image to a user, and capture a face image of the user; a determination module 402, configured to determine an eye image of the user based on the face image; and a detection module 403, configured to perform liveness detection on the user based on the preset image and a to-be-verified image included in the eye image.

In some embodiments, the determination module 402 is configured to determine whether the face image meets a preset condition; if it is determined that the face image meets the preset condition, extract the eye image of the user from the face image.

The preset image comprises a character and/or a pattern, and the to-be-verified image comprises a character and/or a pattern; and the detection module 403 is configured to perform liveness detection on the user based on characteristic information in the preset image and characteristic information in the to-be-verified image, wherein if the preset image or the to-be-verified image comprises a character, the characteristic information comprises at least one of a size, color, and location of the character in the preset image or the to-be-verified image; if the preset image or the to-be-verified image comprises a pattern, the characteristic information comprises at least one of a shape, size, color, and location of the pattern in the preset image or the to-be-verified image.

In some embodiments, the to-be-verified image is reflection of the preset image in the user's eye; and the detection module 403 is configured to compare the preset image with the to-be-verified image, and perform liveness detection on the user based on an obtained comparison result.

In some embodiments, the display module 401 is configured to sequentially display a plurality of preset images in a specified order within a preset time; and the display module 401 is further configured to continuously capture face images of the user at least within the preset time.

In some embodiments, the determination module 402 is configured to: for each of the continuously captured face images, determine an eye image of the user based on the face image as an eye image corresponding to the face image; and the detection module 403 is configured to determine matching preset images from a plurality of displayed preset images, and perform liveness detection on the user based on the quantity of the matching preset images; and/or determine matching face images from the continuously captured face images, and perform liveness detection on the user based on the quantity of the matching face images, wherein each of the matching preset images is a preset image matching a to-be-verified image included in the eye image corresponding to at least one face image; and each of the matching face images is a face image for which a to-be-verified image included in the corresponding eye image matches at least one preset image.

The various modules of the liveness detection apparatus in FIG. 4 may be implemented as software instructions. That is, the apparatus in FIG. 4 may comprise a processor and a non-transitory computer-readable storage medium storing instructions that, when executed by the processor, cause one or more components of the apparatus (e.g., the processor) to perform various steps and methods of the modules described above.

Figure 5:
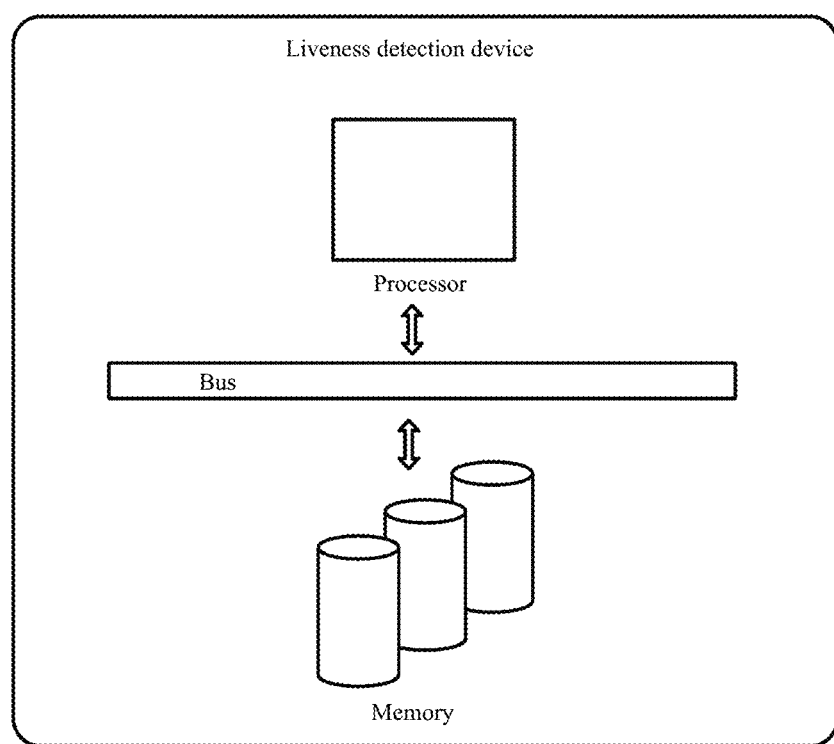
FIG. 5 is a schematic diagram of a liveness detection device according to some embodiments of the application.

Based on the above-described liveness detection method embodiments, accordingly, the application further provides a liveness detection device, as shown in FIG. 5. The device comprises one or more memories and processors, wherein the memory storing a program configured to cause the one or more processors to execute the following steps: displaying a preset image to a user, and capturing a face image of the user; determining an eye image of the user based on the face image; and performing liveness detection on the user based on the preset image and a to-be-verified image included in the eye image.

In one or more embodiments of the application, after a preset image is displayed to a user, a face image of the user may be captured; and a to-be-verified image included in an eye image of the user may be determined from the face image, so that liveness detection can be performed on the user based on the preset image and the to-be-verified image.

The image reflected in the user's eyeball may be captured due to the high reflectivity feature of the eyeball; the captured reflection image is matched with the displayed image, so as to perform liveness detection on the user. In this way, natural liveness detection may be performed on the user by using characteristics of a human body when the user looks at the preset image without feeling the detection, thereby bringing great convenience to the user.

In the 1990s, an improvement in technology can be clearly identified as a hardware improvement (for example, an improvement in a diode, a transistor, a switch, and other circuit structures), or a software improvement (for example, an improvement in a method flow). However, with the development of various technologies, an improvement in many method flows nowadays can be considered as a direct improvement in a hardware circuit structure. Most of design engineers obtain a corresponding hardware circuit structure by programming an improved method flow into a hardware circuit. Therefore, one cannot make the statement that an improvement in a method flow cannot be implemented in a physical hardware module. For example, a programmable logic device (PLD) (for example, a field programmable gate array, FPGA) is such an integrated circuit that the logic functions thereof are determined by programming the device by users. Design engineers can program and "integrate" a digital system in a PLD without having a manufacturer to design and manufacture a dedicated integrated circuit chip. Moreover, at present, instead of manually manufacturing an integrated circuit chip, the programming in most cases is achieved by using "logic compiler" software. The logic compiler is similar to a software compiler used for developing and compiling a program; and before compilation, the raw codes may also need to be complied in some programming language, which is called hardware description language (HDL); furthermore, there are many types rather than only one type of HDL, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), and the like, among which VHDL (Very-High-Speed Integrated Circuit Hardware Description Language) and Verilog are most commonly used at present. Those skilled in the art should understand that simply by performing logic programming on a method flow by using the above-described hardware description languages and by programming the method flow into an integrated circuit, a hardware circuit for implementing the logic method flow can be obtained easily.

A controller can be implemented in any appropriate form; for example, the controller can be in the form of a microprocessor or a processor, a computer-readable medium storing a computer-readable program code (for example, software or hardware) which can be executed by the microprocessor/processor, a logic gate, a switch, an application specific integrated circuit (ASIC), a programmable logic controller, and an embedded micro-controller; the examples of controllers include, but are not limited to, the following micro-controllers: ARC 625D, Atmel AT91SAM, Microchip PIC18F26K20, and Silicone Labs C8051F320. A memory controller can also be implemented as a part of a memory control logic. Those skilled in the art should appreciate that besides the controller being implemented by using only computer-readable program codes, it is completely acceptable to perform logic programming on method steps to enable the controller to realize the same functions in the form of a logic gate, a switch, a dedicated integrated circuit, a programmable logic controller, and an embedded micro-controller. Therefore, the controller can be considered as a hardware component; and an apparatus for implementing various functions included in the controller can also be considered as a structure in the hardware component. Alternatively, an apparatus for implementing various functions can be even considered as both a software module for implementing a method and a structure in the hardware component.

Systems, apparatus, modules, or units described in the above-described embodiments may be implemented by computer chips or entities, or by products with some function. A typical implementation device is a computer. For example, the computer, can be a personal computer, a laptop computer, a cellular phone, a camera phone, a smart phone, a personal digital assistant, a media player, a navigation device, an e-mail device, a game console, a tablet computer, a wearable device, or a combination of any of these devices.

For ease of description, the above apparatus are described on the basis of respective function of each unit thereof. Naturally, when the application is implemented, the functions of the units can be implemented in the same one or more software and/or hardware.

Those skilled in the art should appreciate that the embodiments of the application can be embodied as a method, a system, or a computer program product. Therefore, the present application can take the form of an entire hardware embodiment, an entire software embodiment or an embodiment combining hardware and software elements. Furthermore, the application can take the form of a computer program product embodied in one or more computer usable storage media including computer usable program codes (including, but not limited to, a magnetic disk storage, a CD-ROM, an optical memory, and the like).

The application is described with reference to the flow charts and/or block diagrams of the method, device (system), and computer program product according to the one or more embodiments of the application. It should be understood that each flow and/or block in the flow charts and/or the block diagrams, and a combination of the flows and/or the blocks in the flow charts and/or the block diagrams can be implemented via computer program instructions. The computer program instructions may be loaded onto a general-purpose computer, a specialized computer, an embedded processor, or a processor of any other programmable data processing device to produce a computer such that the instructions which are executed on the computer or the processor of any other programmable data processing device generate an apparatus for implementing the functions specified in one or more flows in a flow chart and/or one or more blocks in a block diagram.

The computer program instructions can also be stored in a computer readable memory which can boot a computer or other programmable data processing devices to operate in a specific manner, such that the instructions stored in the computer readable memory generate a product comprising an instruction apparatus, wherein the instruction apparatus is configured to implement the functions specified in one or more flows in a flow chart and/or one or more blocks in a block diagram.

The computer program instructions can also be loaded to a computer or other programmable data processing devices, so as to perform a series of operation steps on the computer or the other programmable devices to generate a computer-implemented process, such that the instructions executed on the computer or the other programmable devices can provide steps for implementing the functions specified in one or more flows in a flow chart and/or one or more blocks in a block diagram.

In a typical configuration, a computing device comprises one or more processors (CPU), an input/output interface, a network interface, and an internal memory.

The internal memory may comprise a volatile memory on a computer readable medium, a random access memory (RAM), a non-volatile memory, and/or a non-volatile memory, such as a read-only memory (ROM) or a flash random access memory (flash RAM). The internal memory is an example of the computer readable medium.

The computer readable medium includes non-volatile, volatile, removable, and non-removable media which can store information by using any methods or technologies. The information can be a computer-readable instruction, a data structure, a program module, or other data. Examples of the computer storage medium include, but are not limited to, a phase-change random access memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical memories, a cassette tape, and a magnetic tape disk storage, other magnetic storage devices or any other non-transmitting media, which can be used to store information that can be accessed by the computing device. As described herein, the computer-readable media do not include transitory computer-readable media (transitory media), such as modulated data signals and carriers.

It should also be noted that the terms "comprising," "including" or any other variants thereof are intended to cover non-exclusive inclusion, such that a process, method, a product, or device comprising a series of elements comprises not only those elements but also other elements not explicitly listed, or further comprises inherent elements of such process, method, product or device. Unless more limitations are stated, the element defined by the sentence "comprising a . . . " does not exclude the situation that the process, method, commodity, or device comprising the element further comprises another same element.

The application can be described in a general context of a computer executable instruction executed by a computer, for example, a program module. Generally, the program module comprises a routine, a program, an object, an assembly, a data structure, and the like for executing a task or for implementing an abstract data type. The one or more embodiments of the application can also be implemented in a distributed computing environment where a task is executed by a remote processing device connected via a communication network. In the distributed computing environment, the program module can be located in a local and a remote computer storage media comprising a storage device.

The embodiments of the application are all described in a progressive manner. The same or similar parts in the embodiments may be mutually referenced. Each embodiment emphasizes content different from that in other embodiments. Particularly, the system embodiments are basically similar to the method embodiments, and are thus described in a more concise manner. For relevant content, reference may be made to the content in the method embodiments.

The embodiments of the application are described above. Other embodiments fall within the scope of the attached claims. In some situations, actions or steps stated in the claims may be performed in a sequence different from those in the embodiments and the desired results can still be achieved. In addition, the desired results can still be achieved if the processes described in the drawings are not necessarily performed in the illustrated particular or continuous sequence. In some implementation manners, multi-tasking and parallel processing are also feasible or may be advantageous.

Although one or more embodiments of the application are described above, they shall not be construed as limiting the application. For those skilled in the art, one or more embodiments of the application may have various modifications and variations. Any modification, equivalent replacement, or improvement made within the spirit and principle of the one or more embodiments of the application shall fall within the protection scope of the claims of the application.

The invention claimed is:

1. A liveness detection method, comprising:
sequentially displaying a plurality of images to a user;
capturing a plurality of face images of the user while displaying the plurality of images to the user;
for each of the captured face images:
 determining an eye image of an eye of the user based on the face image,
 extracting a to-be-verified image from the eye image of the user, wherein the to-be-verified image is a reflection of a corresponding one of the displayed images in the eye of the user, and
 comparing the corresponding displayed image with the to-be-verified image to determine whether the to-be-verified image matches the corresponding displayed image;
determining a quantity of matches between the to-be-verified images and the corresponding displayed images; and
performing liveness detection on the user based on the quantity of matches.

2. The method according to claim 1, wherein determining the eye image of the user based on the face image comprises:
determining whether the face image contains the user's face or reaches a clarity; and
in response to determining that the face image contains the user's face or reaches the clarity, extracting the eye image of the user from the face image.

3. The method according to claim 1, wherein each displayed image comprises a first character, and each to-be-verified image comprises a second character; and
comparing the corresponding displayed image with the to-be-verified image to determine whether the to-be-verified image matches the displayed image comprises:
 comparing characteristic information in the corresponding displayed image and characteristic information in the to-be-verified image to determine whether the characteristic information in the to-be-verified image matches the characteristic information in the corresponding displayed image, wherein the characteristic information in the corresponding displayed image comprises a size of the first character, a color of the first character, or a location of the first character, and the characteristic information in the to-be-verified image comprises a size of the second character, a color of the second character, or a location of the second character.

4. The method according to claim 1, wherein each displayed image comprises a first pattern, and each to-be-verified image comprises a second pattern; and
comparing the corresponding displayed image with the to-be-verified image to determine whether the to-be-verified image matches the displayed image comprises:
comparing characteristic information in the corresponding displayed image and characteristic information in the to-be-verified image to determine whether the characteristic information in the to-be-verified image matches the characteristic information in the corresponding displayed image, wherein the characteristic information in the corresponding displayed image comprises a shape of the first pattern, a size of the first pattern, a color of the first pattern, or a location of the first pattern, and the characteristic information in the to-be-verified image comprises a shape of the second pattern, a size of the second pattern, a color of the second pattern, or a location of the second pattern.

5. The method according to claim 1, wherein sequentially displaying the plurality of images to a user comprises:
sequentially displaying the plurality of images in a specified order within a time.

6. The method according to claim 5, wherein capturing the plurality of face images of the user while displaying the plurality of images to the user comprises:
continuously capturing the plurality of face images of the user within the time.

7. The apparatus according to claim 1, wherein each displayed image comprises a first character, and each to-be-verified image comprises a second character; and
comparing the corresponding displayed image with the to-be-verified image to determine whether the to-be-verified image matches the corresponding displayed image comprises:
comparing characteristic information in the corresponding displayed image and characteristic information in the to-be-verified image to determine whether the characteristic information in the to-be-verified image matches the characteristic information in the corresponding displayed image, wherein the characteristic information in the displayed image comprises a size of the first character, a color of the first character, or a location of the first character, and the characteristic information in the to-be-verified image comprises a size of the second character, a color of the second character, or a location of the second character.

8. A liveness detection apparatus comprising: one or more processors and one or more non-transitory computer-readable memories coupled to the one or more processors and configured with instructions executable by the one or more processors to cause the apparatus to perform operations comprising:
sequentially displaying a plurality of images to a user;
capturing a plurality of face images of the user while displaying the plurality of images to the user;
for each of the captured face images:
determining an eye image of an eye of the user based on the face image;
extracting a to-be-verified image from the eye image of the user, wherein the to-be-verified image is a reflection of the corresponding displayed image in the eye of the user, and
comparing the corresponding displayed image with the to-be-verified image to determine whether the to-be-verified image matches the corresponding displayed image;
determining a quantity of matches between the to-be-verified images and the corresponding displayed images; and
performing liveness detection on the user based on the quantity of matches.

9. The apparatus according to claim 8, wherein determining the eye image of the user based on the face image comprises:
determining whether the face image contains the user's face or reaches a clarity; and
in response to determining that the face image contains the user's face or reaches the clarity, extracting the eye image of the user from the face image.

10. The apparatus according to claim 8, wherein each displayed image comprises a first pattern, and each to-be-verified image comprises a second pattern; and
comparing the corresponding displayed image with the to-be-verified image to determine whether the to-be-verified image matches the corresponding displayed image comprises:
comparing characteristic information in the corresponding displayed image and characteristic information in the to-be-verified image to determine whether the characteristic information in the to-be-verified image matches the characteristic information in the corresponding displayed image, wherein the characteristic information in the displayed image comprises a shape of the first pattern, a size of the first pattern, a color of the first pattern, or a location of the first pattern, and the characteristic information in the to-be-verified image comprises a shape of the second pattern, a size of the second pattern, a color of the second pattern, or a location of the second pattern.

11. The apparatus according to claim 8, wherein sequentially displaying the plurality of images to a user comprises:
sequentially displaying the plurality of images in a specified order within a time.

12. The apparatus according to claim 11, wherein capturing the plurality of face images of the user while displaying the plurality of images to the user comprises:
continuously capturing the plurality of face images of the user within the time.

13. A non-transitory computer-readable storage medium configured with instructions executable by one or more processors to cause the one or more processors to perform operations comprising:
sequentially displaying a plurality of images to a user;
capturing a plurality of face images of the user while displaying the plurality of images to the user;
for each of the captured face images:
determining an eye image of an eye of the user based on the face image,
extracting a to-be-verified image from the eye image of the user, wherein the to-be-verified image is reflection of the corresponding displayed image in the eye of the user, and comparing the corresponding displayed image with the to-be-verified image to determine whether the to-be-verified image matches the corresponding displayed image;

determining a quantity of matches between the to-be-verified images and the corresponding displayed images; and performing liveness detection on the user based on the quantity of matches.

14. The non-transitory computer-readable storage medium according to claim 13, wherein determining the eye image of the user based on the face image comprises:

determining whether the face image contains the user's face or reaches a clarity; and in response to determining that the face image contains the user's face or reaches the clarity, extracting the eye image of the user from the face image.

15. The non-transitory computer-readable storage medium according to claim 13, wherein each displayed image comprises a first character, and each to-be-verified image comprises a second character; and comparing the corresponding displayed image with the to-be-verified image to determine whether the to-be-verified image matches the displayed image comprises:

comparing characteristic information in the corresponding displayed image and characteristic information in the to-be-verified image to determine whether the characteristic information in the to-be-verified image matches the characteristic information in the corresponding displayed image, wherein the characteristic information in the corresponding displayed image comprises a size of the first character, a color of the first character, or a location of the first character, and the characteristic information in the to-be-verified image comprises a size of the second character, a color of the second character, or a location of the second character.

16. The non-transitory computer-readable storage medium according to claim 13, wherein each displayed image comprises a first pattern, and each to-be-verified image comprises a second pattern; and comparing the corresponding displayed image with the to-be-verified image to determine whether the to-be-verified image matches the displayed image comprises:

comparing characteristic information in the corresponding displayed image and characteristic information in the to-be-verified image to determine whether the characteristic information in the to-be-verified image matches the characteristic information in the corresponding displayed image, wherein the characteristic information in the corresponding displayed image comprises a shape of the first pattern, a size of the first pattern, a color of the first pattern, or a location of the first pattern, and the characteristic information in the to-be-verified image comprises a shape of the second pattern, a size of the second pattern, a color of the second pattern, or a location of the second pattern.

17. The non-transitory computer-readable storage medium according to claim 13, wherein sequentially displaying the plurality of images to a user comprises:

sequentially displaying the plurality of images in a specified order within a time.

18. The non-transitory computer-readable storage medium according to claim 17, wherein capturing the plurality of face images of the user while displaying the plurality of images to the user comprises:

continuously capturing the plurality of face images of the user within the time.

* * * * *